(12) United States Patent
Wu et al.

(10) Patent No.: US 12,092,297 B2
(45) Date of Patent: Sep. 17, 2024

(54) LAMP CONTAINING A ROTATION PREVENTION STRUCTURE

(71) Applicants: Qingbiao Wu, Fujian (CN); Linlin Wu, Fujian (CN)

(72) Inventors: Qingbiao Wu, Fujian (CN); Linlin Wu, Fujian (CN)

( * ) Notice: Subject to any disclaimer, the term of this patent is extended or adjusted under 35 U.S.C. 154(b) by 0 days.

(21) Appl. No.: 18/237,417

(22) Filed: Aug. 24, 2023

(65) Prior Publication Data
US 2024/0210013 A1 Jun. 27, 2024

Related U.S. Application Data

(63) Continuation-in-part of application No. 18/086,666, filed on Dec. 22, 2022, now Pat. No. 11,788,711.

(51) Int. Cl.
*F21V 17/00* (2006.01)
*F21V 17/16* (2006.01)
*F21V 19/00* (2006.01)
*F21V 23/00* (2015.01)
*F21Y 115/10* (2016.01)

(52) U.S. Cl.
CPC .......... *F21V 17/005* (2013.01); *F21V 17/164* (2013.01); *F21V 19/005* (2013.01); *F21V 23/002* (2013.01); *F21Y 2115/10* (2016.08)

(58) Field of Classification Search
CPC .. F21K 9/232; F21K 9/235; F21S 4/10; F21V 19/006
See application file for complete search history.

(56) References Cited

U.S. PATENT DOCUMENTS

| | | | | |
|---|---|---|---|---|
| 1,189,044 | A * | 6/1916 | Boden | F16M 11/28 362/285 |
| 2,118,785 | A * | 5/1938 | Birdseye | H01R 33/94 439/6 |
| 10,718,471 | B1 * | 7/2020 | Wu | F21K 9/238 |
| 2013/0250583 | A1 * | 9/2013 | Chang | F21V 3/02 362/362 |
| 2018/0372278 | A1 * | 12/2018 | Zhang | F21K 9/237 |

* cited by examiner

Primary Examiner — William N Harris (57) ABSTRACT

A lamp, having a lampshade, a lamp holder, a connective structure, a light source component, and a power supply component; the lampshade has a cover body and a mounting seat; one end being defined as a first end of the connective structure is connected with the lampshade, with another end being defined as a third end connected with the lamp holder; the mounting seat is mounted to the first end; the lamp holder is fitted with the third end; a rotation prevention structure between the mounting seat and the first end is given to prevent rotation of the lampshade relative to the connective structure; the rotation prevention structure contains anti-rotation ribs and anti-rotation grooves corresponding to the anti-rotation ribs; the anti-rotation ribs are fitted in the anti-rotation grooves.

15 Claims, 9 Drawing Sheets

LAMP CONTAINING A ROTATION PREVENTION STRUCTURE

CROSS REFERENCE TO RELATED APPLICATIONS

The present invention is a continuation-in-part application of Ser. No. 18/086,666 filed Dec. 22, 2022 titled "Decorative light bulb and its production process"

FIELD OF THE INVENTION

The invention relates to the technical field of decorative lighting, in particular to a lamp containing a rotation prevention structure.

BACKGROUND OF THE INVENTION

In recent years, the overall living standard has been improving. String lights of decorative light bulbs are not only seen in festival decorations, but are also more and more frequently used in business promotion or public space beautification, hence there is a greater demand for such products.

A Chinese patent document (Patent no.: CN215807988U) discloses a decorative light bulb, including a lampshade, a lamp holder, a light source component, a power supply component, a lampshade base and a lamp holder base. A mounting seat of the lampshade is inserted in the lampshade base, and the lamp holder base is inserted in the lamp holder. The power supply component includes wires, and the lampshade base and the lamp holder base are provided with through holes for the wires to pass through. In this patent, a connective structure is added between the lampshade and the lamp holder, and the wires connect the lampshade base and the lamp holder base. Users may adjust the lengths of the wires according to their own preferences, so that string lights of decorative light bulbs are suitable for more occasions.

In the above-mentioned decorative light bulb, waterproof sealing of the decorative light bulb requires more sealing structures between the light bulb and the connective structure, and between the lamp holder and the connective structure. The cost is relatively high, and the assembling method is too cumbersome for actual use.

In view of the disadvantages in the prior art, the Applicant conducted in-depth research on the above-mentioned problems and hereby submit this patent application.

BRIEF SUMMARY OF THE INVENTION

It is an object of the present invention to provide a lamp containing a rotation prevention structure. The lamp is simple in structure, low in cost, and more convenient to use.

To fulfill the above objects, the present invention adopts the following technical solutions:

A lamp containing a rotation prevention structure, wherein the lamp comprises a lampshade, a lamp holder, and a light source component and a power supply component both provided in the lampshade and electrically connected with each other; the lampshade comprises a cover body and a mounting seat integrated with the cover body; wherein, a connective structure is provided to connect the lampshade and the lamp holder; the connective structure comprises one end connected with the lampshade, and another end connected with the lamp holder; said one end of the connective structure is defined as a first end, and said another end of the connective structure is defined as a third end; the mounting seat is mounted to the first end of the connective structure; the lamp holder is fitted with the third end of the connective structure; a rotation prevention structure is provided between the mounting seat and the first end of the connective structure to prevent rotation of the lampshade with respect to the connective structure; the rotation prevention structure comprises anti-rotation ribs and anti-rotation grooves corresponding to the anti-rotation ribs; the anti-rotation ribs are fitted in the anti-rotation grooves.

Preferably, the anti-rotation ribs are provided at an outer side wall of the mounting seat along an axial direction of the lampshade; an interior of the first end is provided with the anti-rotation grooves corresponding to the anti-rotation ribs; the anti-rotation ribs are fitted in the anti-rotation grooves.

Preferably and alternatively, the anti-rotation ribs are provided on an inner wall of the first end along an axial direction of the lampshade, and the anti-rotation grooves corresponding to the anti-rotation ribs are provided on an outer side wall of the mounting seat; the anti-rotation ribs are fitted in the anti-rotation grooves.

Preferably, the mounting seat is fastened to the first end of the connective structure.

Preferably, at least one elastic projection is formed at an outer side wall of the mounting seat; an interior of the first end is provided with at least one slot corresponding to said at least one elastic projection; the lampshade and the first end of the of the connective structure are locked by fastening each elastic projection with a corresponding slot; each elastic projection comprises an inner connecting end and a free end; an inclined surface which is inclined upwardly from the free end to the inner connecting end towards a central axis of the mounting seat is provided between the inner connecting end and the free end; and after each elastic projection is fastened to the corresponding slot, the free end of the elastic projection abut against the corresponding slot.

Preferably and alternatively, at least one elastic projection is formed on an inner wall of the first end; an outer side wall of the mounting seat is provided with at least one slot corresponding to said at least one elastic projection; the lampshade and the first end of the of the connective structure are locked by fastening each elastic projection with a corresponding slot; each elastic projection comprises an inner connecting end and a free end; an inclined surface which is inclined downwardly from the free end to the inner connecting end away from a central axis of the mounting seat is provided between the inner connecting end and the free end; after each elastic projection is fastened to the corresponding slot, the free end of the elastic projection abut against the corresponding slot.

Preferably, the connective structure comprises a lampshade base, a lamp holder base and a connecting component which fixes the lampshade base with the lamp holder base; the lampshade base comprises said first end of the connective structure connected with the mounting seat, and a second end connected with the connecting component; the connecting component is snap-fitted with the second end of the lampshade base.

Preferably, the second end is provided with a through hole which allows the connecting component to pass through; an outer wall of the connecting component is provided with a groove; an inner wall of the through hole is provided with a bump corresponding to the groove, and the bump is fitted in the groove.

Preferably, an inner end surface of the groove proximal to the lampshade, and an outer end surface of the bump proximal to the lampshade tilt downwards towards an axis of the lampshade.

Preferably and alternatively, an inner end surface of the groove proximal to the lampshade, or an outer end surface of the bump proximal to the lampshade tilt downwards towards an axis of the lampshade.

Preferably, the power supply component comprises a first wire and a second wire, the lamp holder base and the connecting component are provided with through holes allowing the first wire and the second wire to pass through; first connection ends of the first wire and the second wire pass through the through holes of the lamp holder base and are connected to the lamp holder, while second connection ends of the first wire and the second wire pass through the through holes of the connecting component and are electrically connected to the light source component.

Preferably, the connecting component and the first wire and the second wire are integrally formed by injection molding.

Preferably, a transparent seat is provided in the lampshade; the transparent seat is in interference fit with the mounting seat; the transparent seat is transparent and has a columnar shape; a diameter of the transparent seat gradually decreases along a direction away from the lamp holder; a side of the transparent seat proximal to the lamp holder is provided with hooks, which hook onto an end of the mounting seat.

Preferably, the light source component comprises a transparent stem, a power board fixedly installed on the transparent seat, first rigid electrically-conductive strips inserted to the transparent stem, second rigid electrically-conductive strips inserted to the transparent stem and connected with the power board, and LED filaments fixedly connected between the first rigid electrically-conductive strips and the second rigid electrically-conductive strips; wherein, there are two said second rigid electrically-conductive strips; there are two or more said LED filaments, and the LED filaments are distributed evenly around the transparent stem; each of the second rigid electrically-conductive strips is connected with at least one of said LED filaments.

Preferably, the two second rigid electrically-conductive strips pass through the power board and are connected with the first wire and the second wire respectively; a junction between each of the second rigid electrically-conductive strips and a corresponding wire is provided with a heat shrinkable sleeve.

Preferably, an accommodating space in which glue is filled is provided between the transparent seat and the end of the mounting seat.

According to the above technical solutions, the present invention has the following beneficial effects:
1. Due to the rotation prevention structure, rotation of the lampshade relative to the connective structure is prevented, so that the wires of the power supply component are prevented from damage due to the rotation of the lampshade relative to the connective structure.
2. Fastening of the mounting seat to the first end allows direct connection which has a simpler structure facilitating installation and operation. Due to cooperative engagement between said at least one elastic projection and a corresponding slot, aging of said at least one elastic projection can be delayed, and the lampshade and the connective structure are also fixed in position relative to each other by easily pulling up the lampshade in order to install all the relevant components easily, thereby greatly improving the production efficiency of the lamp.
3. Due to the interference fit between the mounting seat and the transparent seat, and due to the fact that the transparent seat is pressed into the mounting seat of the lampshade, good sealing effect is achieved between the transparent seat and the lampshade. Accordingly, the light source components in the lampshade have better waterproof effect, and the general waterproof performance of the lamp is effectively enhanced.
4. The present invention is simple in structure, low in cost, and more convenient to use.

Denotations in the figures: lampshade 1, cover body 11, mounting seat 12, elastic projection 121, inner connecting end 1211; free end 1212; accommodating space 122, anti-rotation rib 123, inclined surface 124; lamp holder 2, internal threads 21, transparent seat 3, hooks 31, electrically-conductive strip holes 32, lampshade base 4, first end 41, slot 411, anti-rotation groove 412, second end 42, through hole 421, bump 422, third end 43, lamp holder base 5, external threads 51, second through holes 52, clamping part 53, connecting component 6, groove 61, first through holes 62, first wire 71, first connection end 711 (of the first wire 71), second connection end 712 (of the first wire 71), second wire 72, first connection end 721 (of the second wire 72), second connection end 722 (of the second wire 72), power board 73, heat shrinkable sleeve 74, transparent stem 81, first rigid electrically-conductive strips 82, second rigid electrically-conductive strips 83, LED filaments 84, and glue 9.

DETAILED DESCRIPTION OF THE INVENTION

The technical solution in the embodiments of this invention will be clearly and completely described below with reference to the attached drawings. The described embodiments are illustrative only and do not represent all embodiments of this invention. Based on the embodiments of this invention, all other embodiments obtained by ordinary persons skilled in the art without inventive efforts shall also fall within the protection scope of this invention.

Embodiment 1

According to FIG. 1 to FIG. 9:

A lamp containing a rotation prevention structure, wherein the lamp comprising a lampshade 1, a lamp holder 2, a connective structure connecting the lampshade 1 and the lamp holder 2, a light source component and a power supply component, both provided in the lampshade 1 and electrically connected with each other, and a transparent seat 3 inside the lampshade 1; the power supply component comprises a first wire 71, a second wire 72, and a power board 73 which is installed on the transparent seat 3. The connective structure comprises one end (which is a first end 41 as will be described below) connected with the lampshade 1, and another end (which is a third end 43 as will be described below) connected with the lamp holder 2.

The connective structure comprises a lampshade base 4, a lamp holder base 5 and a connecting component 6 which fixes the lampshade base 4 with the lamp holder base 5 via the first wire 71 and the second wire 72. The lampshade 1, the transparent seat 3, the lampshade base 4, the lamp holder base 5 and the connecting component 6 are all made of plastic, such that this invention has a better drop-resistance; there is also no need to use open fire in the production process.

The lampshade 1 comprises a cover body 11 and a mounting seat 12 integrated with the cover body 11; the transparent seat 3 is inserted into the mounting seat 12 via interference fit; the transparent seat 3 has a columnar shape and is transparent; a diameter of the transparent seat 3 gradually decreases along a direction away from the lamp holder 2; due to the interference fit between the transparent seat 3 and the mounting seat 12, the transparent seat 3 and the lampshade 1 is well sealed so that the light source component and the power supply component in the cover body 11 has a higher waterproof level, thereby the light bulb is more waterproof.

Furthermore, a side of the transparent seat 3 proximal to the lamp holder 2 is provided with hooks 31, which hook onto an end of the mounting seat 12; also, the transparent seat 3 is inserted into the mounting seat 12 via interference fit. Accordingly, connection between the transparent seat 3 and the mounting seat 12 is further enhanced.

The lampshade base 4 comprises a first end 41 connected with the mounting seat 12, and a second end 42 connected with the connecting component 6; the mounting seat 12 is detachably inserted in the first end 41, and the lamp holder base 5 has a third end 43 which is detachably inserted in the lamp holder 2. Wherein, the cover body 11 of the lampshade 1, not inserted in the first end 41, has a shape same as a traditional incandescent lamp, and the shape may also be designed according to actual needs.

The mounting seat 12 is fastened to the first end 41 of the lampshade base 4. Particularly, when the lampshade 1 is molded by injection, at least one elastic projection 121 is formed at an outer side wall of the mounting seat 12; an interior of the first end 41 is provided with at least one slot 411 corresponding to said at least one elastic projection 121; the lampshade 1 and the lampshade base 4 are locked by fastening each elastic projection 121 with a corresponding slot 411 to prevent the lampshade 1 and the lampshade base 4 from moving along an axial direction, in other words, to prevent the lampshade base 4 from being pulled away from the lampshade 1 during assembly. Specifically, with reference to FIG. 9, each elastic projection 121 comprises an inner connecting end 1211 and a free end 1212; an inclined surface 124 which is inclined upwardly from the free end 1212 to the inner connecting end 1211 towards a central axis of the mounting seat 12 is provided between the inner connecting end 1211 and the free end 1212; the inclined surface 124 facilitates a corresponding elastic projection 121 to be more smoothly fastened to a corresponding slot 411 when the lamp is assembled by pulling up the lampshade 1, and after the corresponding elastic projection 121 is fastened to the corresponding slot 411, the free end 1212 of the elastic projection 121 abut against the corresponding slot 411. As an example, said at least one elastic projection 121 is formed circumferentially and evenly around the outer side wall of the mounting seat 12, and when the lampshade 1 is pulled upwardly by an external force during assembly, said at least one elastic projection 121 is elastically deformed in a way that a diameter of the mounting seat 12 is reduced, and when said at least one elastic projection 121 is deformed to an extent where the diameter of the mounting seat 12 is small than an inner diameter of the first end 41 of the lampshade base 4, the mounting seat 12 can move upwardly into the first end 41; by continual pulling of the lampshade 1, said at least one elastic projection 121 of the mounting seat 12 will be pulled upwardly to a position corresponding to a corresponding slot 411, and the elastic projection 121 will be elastically reset and thus enters the corresponding slot 411; after that, stop pulling the lampshade 1 to complete the assembly of the lampshade 1 and the first end 41 of the lampshade base 4. In this assembled state, the free end 1212 of each elastic projection 121 abuts against the corresponding slot 411 so that the lampshade 1 will not be disengaged from the first end 41 because of external forces.

Figure 1:
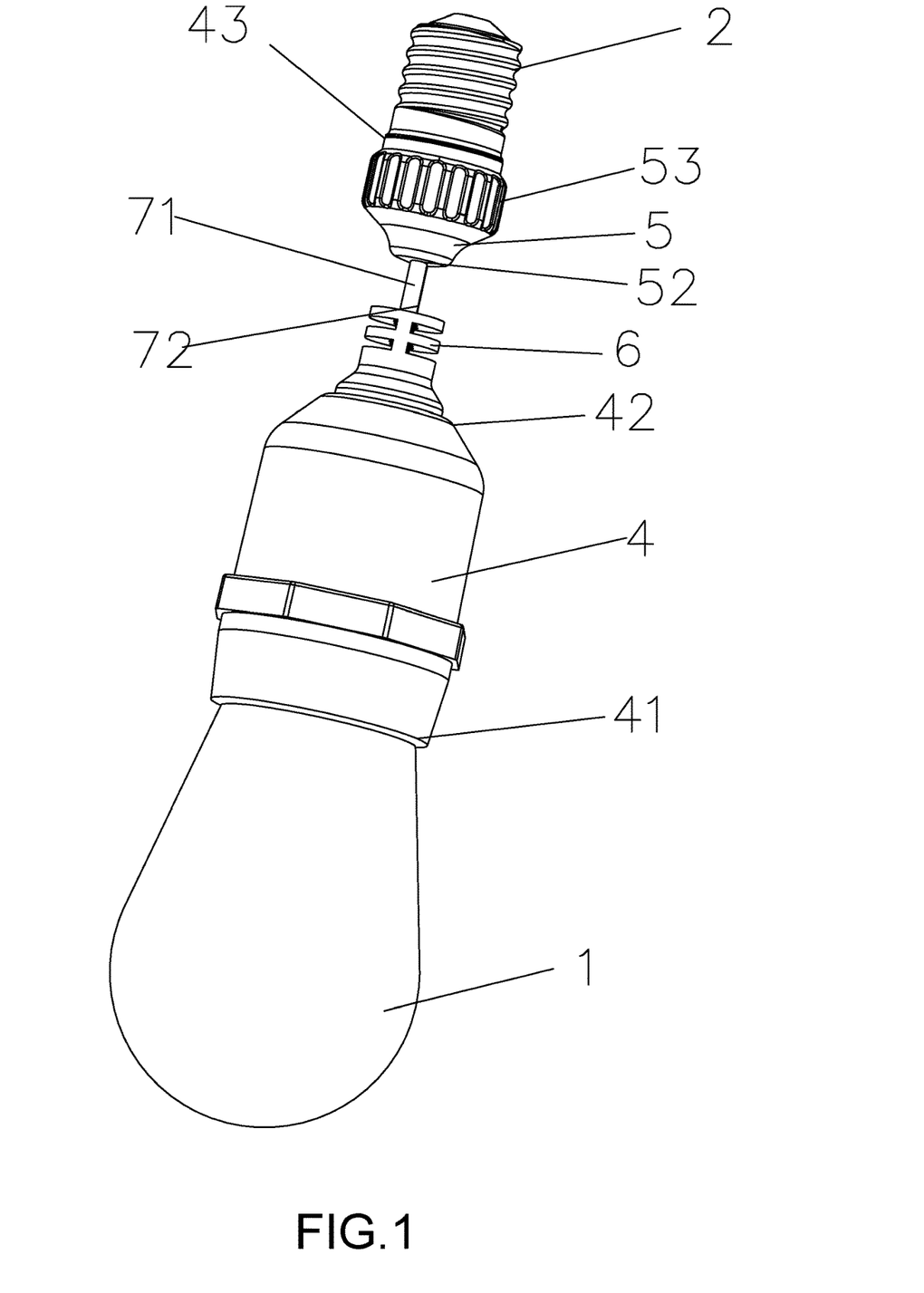
FIG. 1 is a schematic view of this invention.
Figure 2:
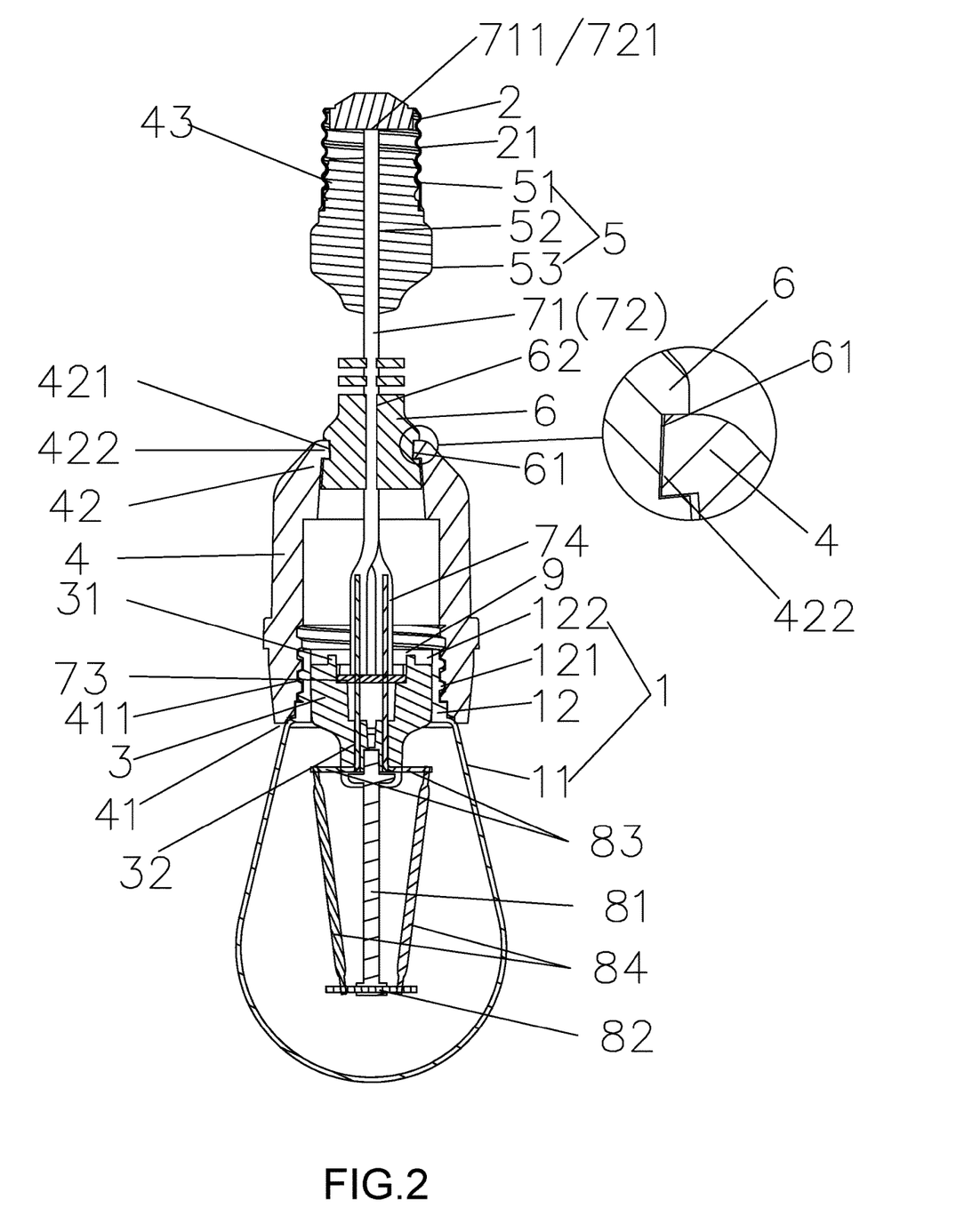
FIG. 2 is a cross-sectional view of this invention.
Figure 3:
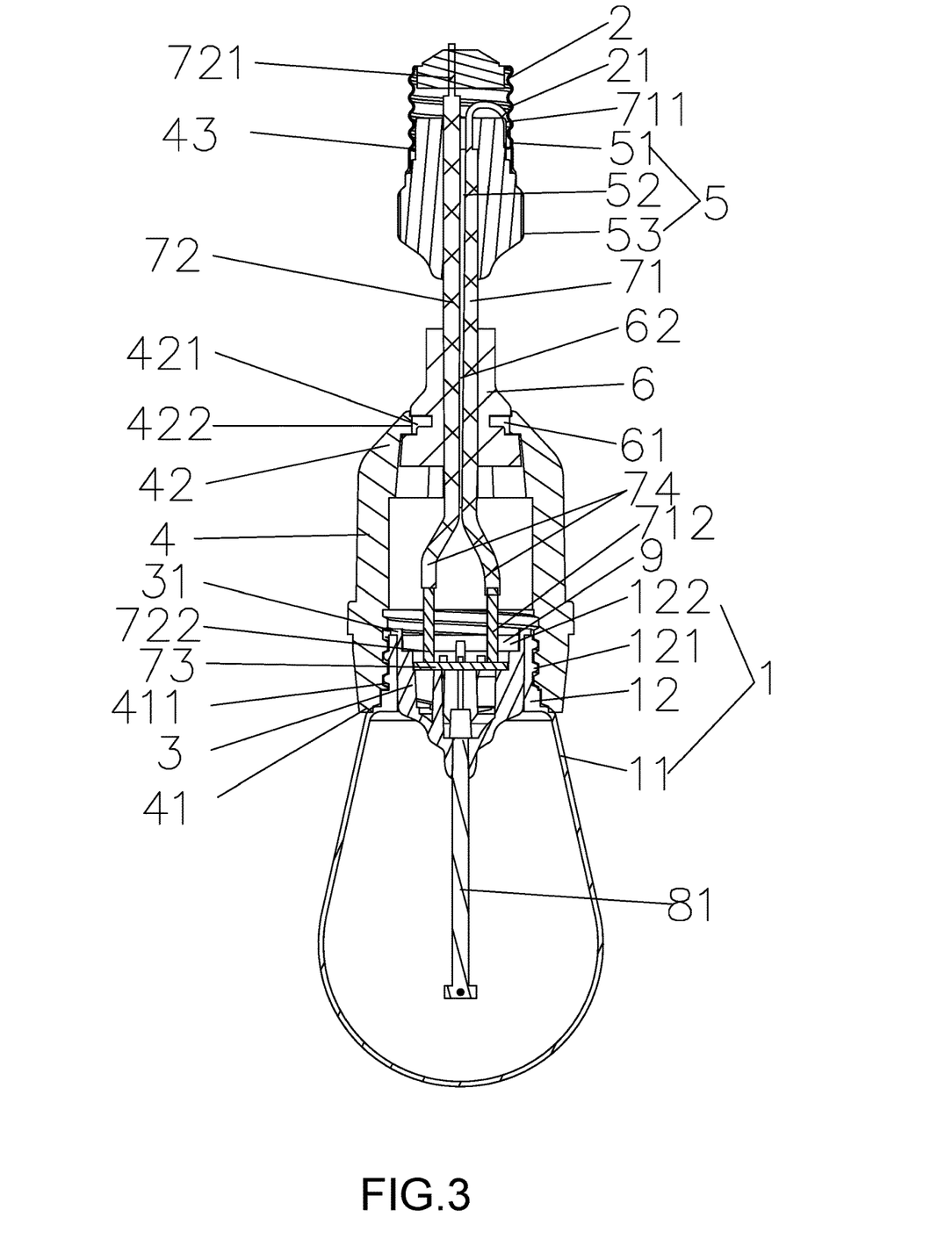
FIG. 3 is another cross-sectional view of this invention.
Figure 4:
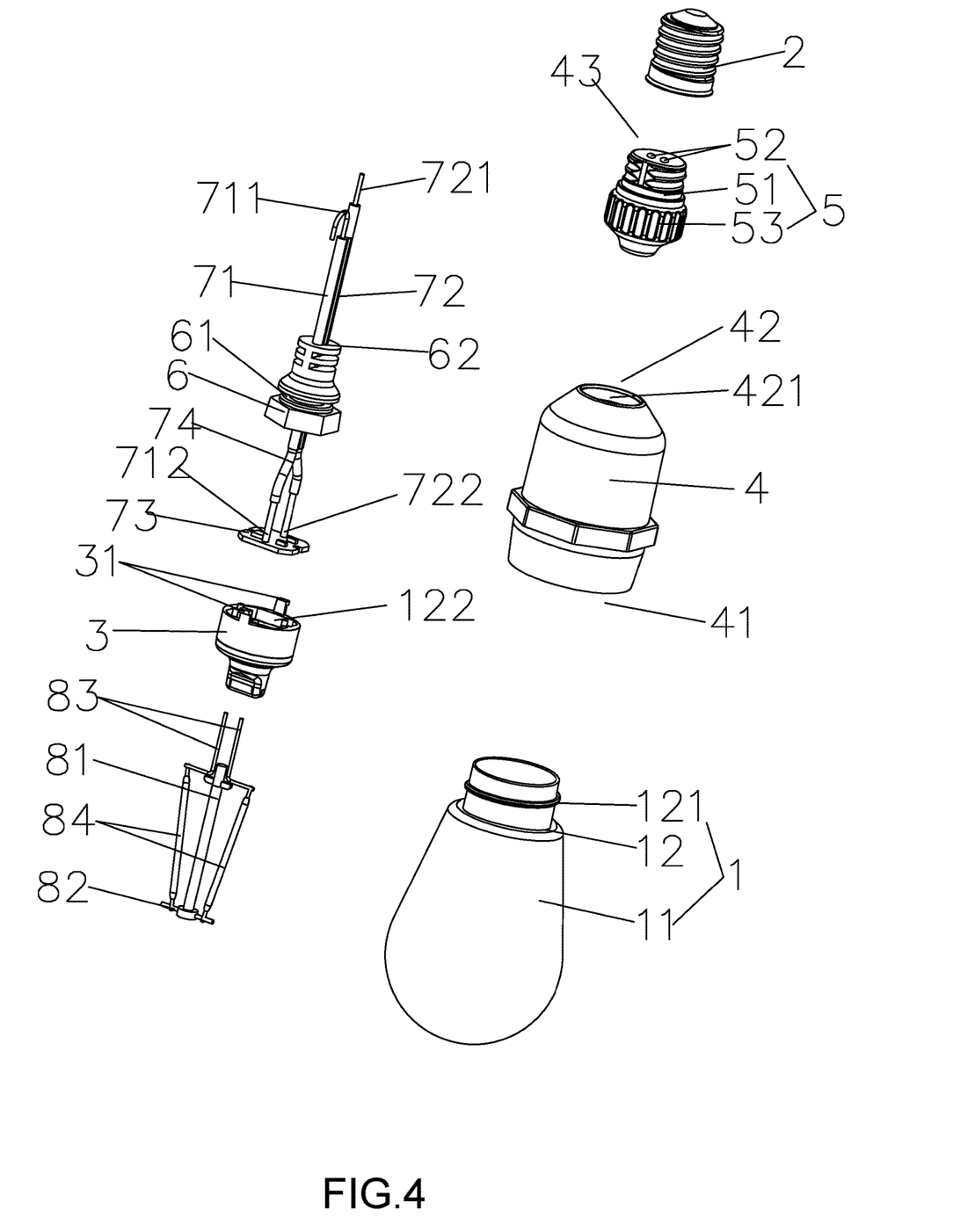
FIG. 4 is an exploded view of this invention.
Figure 5:
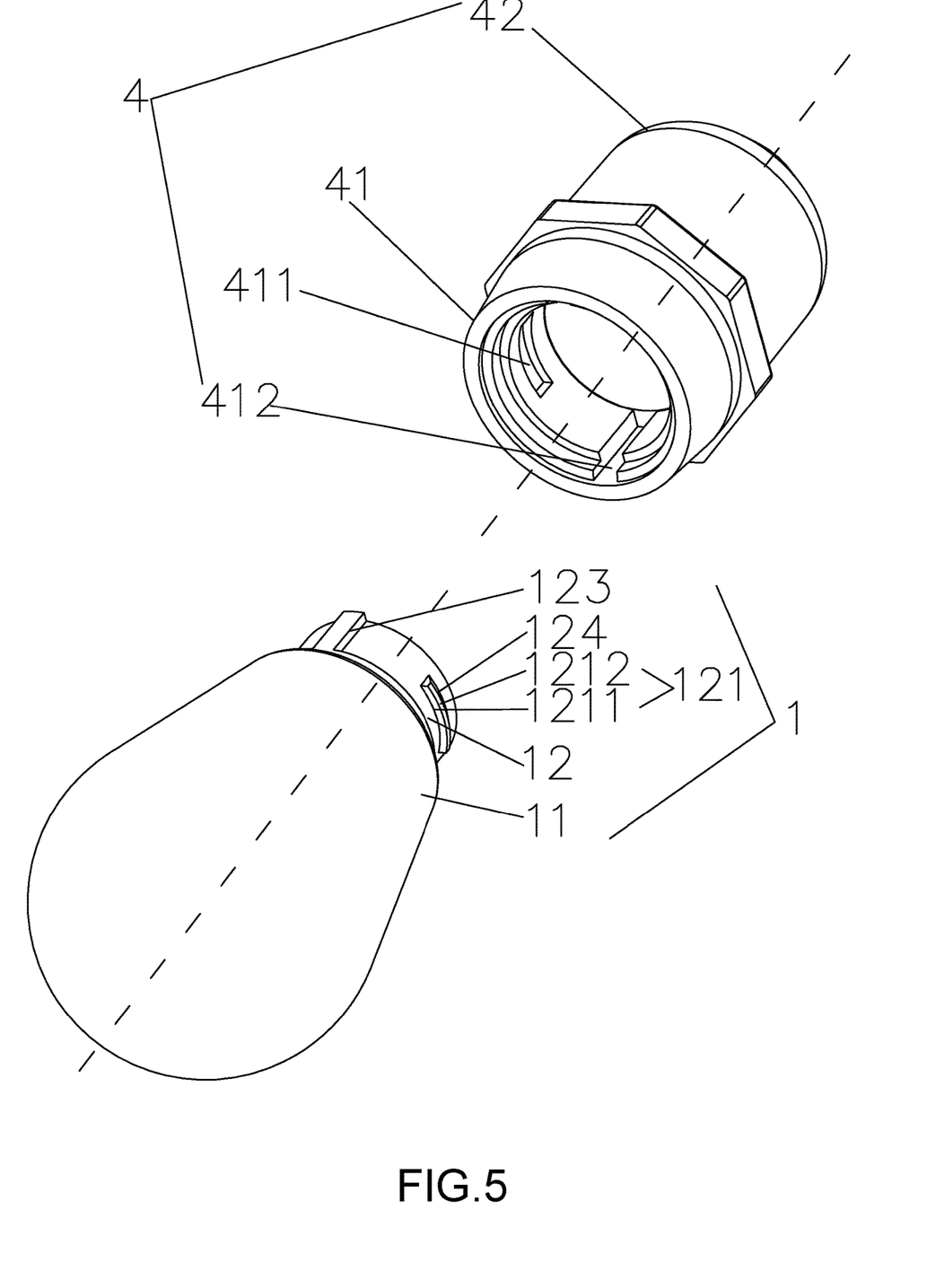
FIG. 5 is a schematic view of the lampshade and the lampshade base according to embodiment 1 of this invention.
Figure 6:
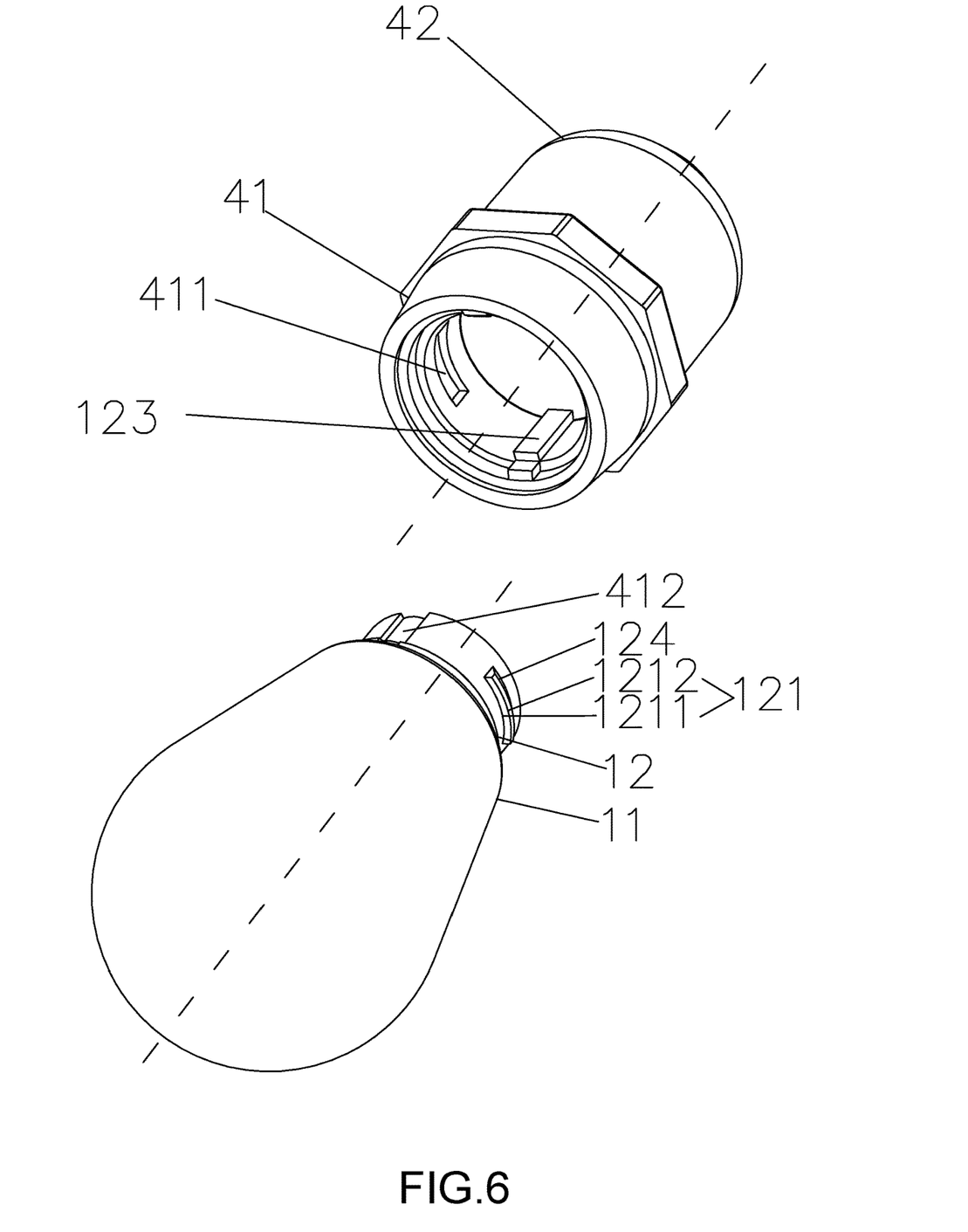
FIG. 6 is a schematic view of the lampshade and the lampshade base according to a variation of embodiment 1 of this invention.
Figure 7:
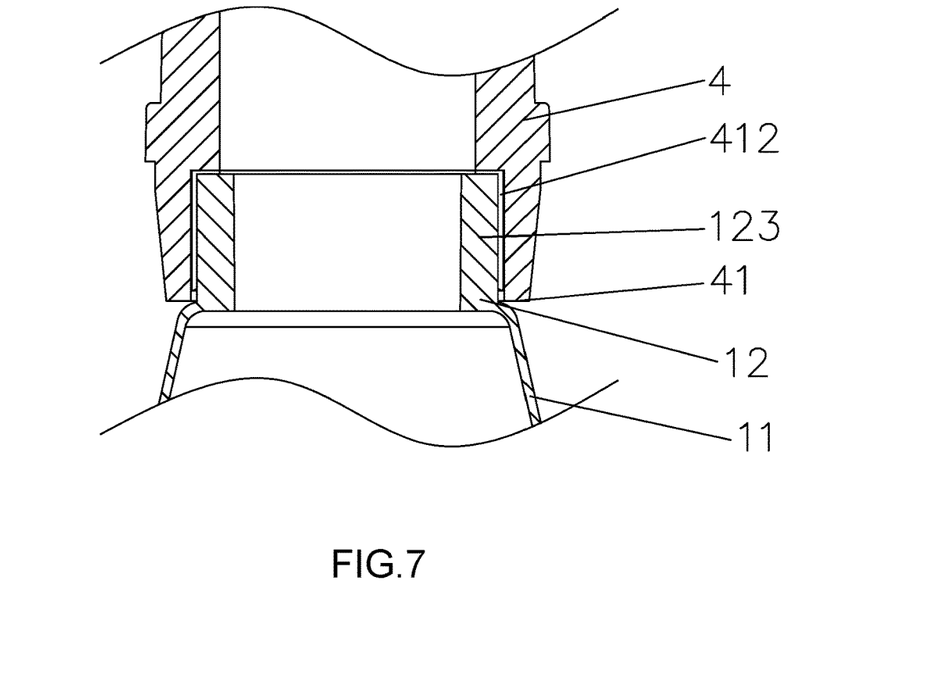
FIG. 7 is a partial sectional view of the lamp showing connection between the anti-rotation ribs and the anti-rotation grooves when the structure shown in FIG. 5 is assembled.
Figure 8:
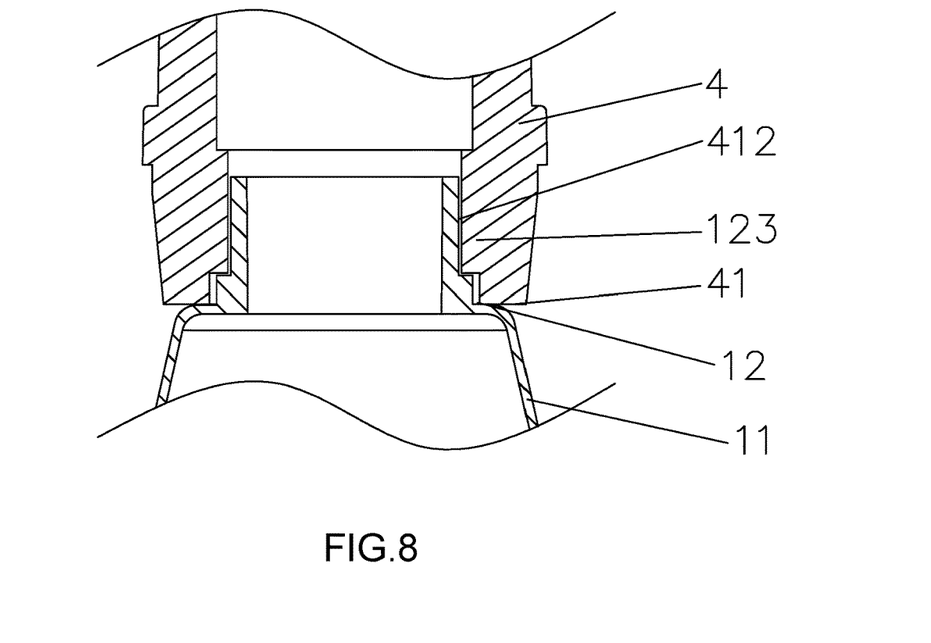
FIG. 8 is a partial sectional view of the lamp showing connection between the anti-rotation ribs and the anti-rotation grooves when the structure shown in FIG. 6 is assembled.
Figure 9:
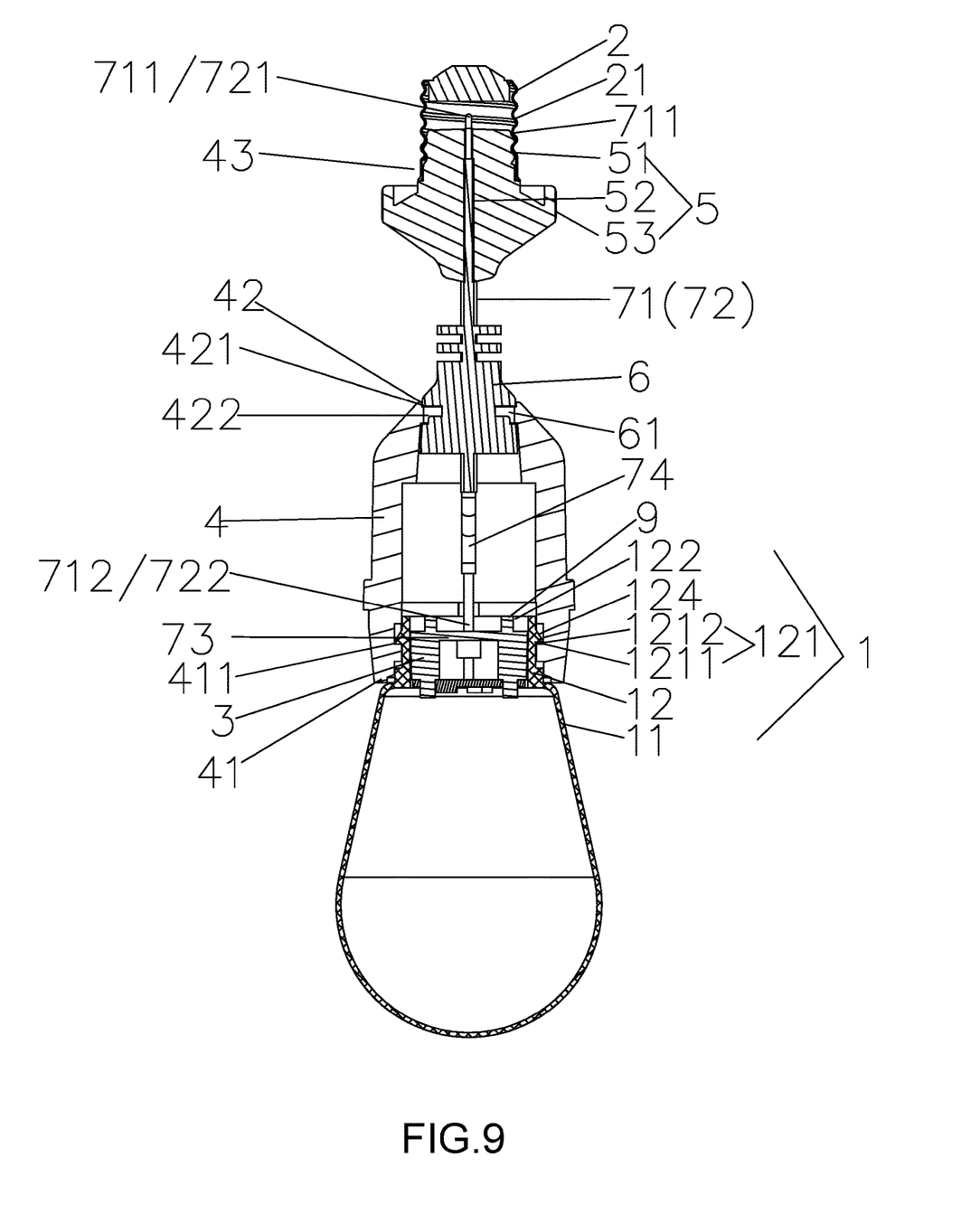
FIG. 9 is a cross-sectional view of this invention according to embodiment 1 of this invention.

Further, with reference to FIG. 5 and FIG. 7, a rotation prevention structure is provided between the mounting seat 12 and the first end 41 of the lampshade base 4 to prevent rotation of the lampshade 1 with respect to the connective structure; the rotation prevention structure comprises anti-rotation ribs 123 and anti-rotation grooves 412 corresponding to the anti-rotation ribs 123. Specifically, the anti-rotation ribs 123 are provided at the outer side wall of the mounting seat 12 along an axial direction of the lampshade 1; the interior of the first end 41 is provided with the anti-rotation grooves 412 corresponding to the anti-rotation ribs 123; the anti-rotation ribs 123 are fitted in the anti-rotation grooves 412 to prevent rotation between the lampshade 1 and the lampshade base 4. Said at least one elastic projection 121 and said at least one slot 411 cooperatively provided, as well as the anti-rotation ribs 123 and the anti-rotation grooves 412 cooperatively provided not only limit the movement of the lampshade 1 and the lampshade base 4 along the axial direction of the lampshade, but also limit the rotation between them, thereby achieving fixation between the lampshade 1 and the lampshade base 4. It should also be noted that, with reference to FIG. 6 and FIG. 8, a variation can be made to the anti-rotation ribs 123 and anti-rotation grooves 412 described above. Specifically, the anti-rotation ribs 123 are provided on an inner wall of the first end 41, and the anti-rotation grooves 412 are provided on the outer side wall of the mounting seat 12; similarly, according to this variation, the anti-rotation ribs 123 are also fitted in the anti-rotation grooves 412 to prevent the lampshade 1 to rotate with respect to the lampshade base 4.

The lamp holder base 5 is detachably inserted in the lamp holder 2, and the lamp holder 2 is connected with the lamp holder base 5 via threads; the lamp holder 2 is a threaded head commonly used in a traditional incandescent lamp, and is usually formed by die casting, hence internal threads 21 are formed in the lamp holder 2 when external threads are formed on the outside; external threads 51 fitting with the internal threads 21 of the lamp holder 2 is provided on the lamp holder base 5; the lamp holder 2 and the lamp holder base 5 are locked together by threads. Other connection methods may also be adopted in this invention, for example, the lamp holder 2 and the lamp holder base 5 may be connected by snap-fit. Various methods, not described herein, may be adopted as long as the lamp holder 2 and the lamp holder base 5 are connected.

The connecting component 6 is detachably inserted in the second end 42 of the lampshade base 4 via snap-fit. The second end 42 is provided with a through hole 421 which allows the connecting component 6 to pass through; an outer wall of the connecting component 6 is provided with a groove 61; an inner wall of the through hole 421 is provided with a bump 422 correspondingly to the groove 61, and thus the bump 422 is fitted in the groove 61. Via connection between the bump 422 and the groove 61, the connecting component 6 and the lampshade base 4 are connected. Furthermore, an inner end surface of the groove 61 proximal to the lampshade 1, and/or an outer end surface of the bump 422 proximal to the lampshade 1 tilt downwards towards the axis of the lampshade 1 for position limiting purpose. This design prevents the connecting component 6 from being over-pulled and detaching from the lampshade base 4. Other connection methods may also be adopted in this invention, for example, the connecting component 6 and the second end 42 may be connected by threads. Various methods, not described herein, may be adopted as long as the connecting component 6 and the second end 42 are connected.

The light source component comprises a transparent stem 81, first rigid electrically-conductive strips 82 inserted to the transparent stem 81, second rigid electrically-conductive strips 83 inserted to the transparent stem 81 and connected with the power board 73, and LED filaments 84 fixedly connected between the first rigid electrically-conductive strips 82 and the second rigid electrically-conductive strips 83; specifically, there are two second rigid electrically-conductive strips 83. A connecting method of the transparent stem 81, the first rigid electrically-conductive strips 82, the second rigid electrically-conductive strips 83, the LED filaments 84 and the transparent seat 3 are not described herein, as the method is already described in the Chinese patent document no. CN209762751U. Other light source component apart from the aforementioned may be adopted and will not be described herein.

The first wire 71 and the second wire 72 each includes a first connection end 711/721 connected to a power supply and a second connection end 712/722 connected to the power board 73. It should be noted that the first connecting end 711 of the first wire 71 can be connected to a neutral wire of the utility power, and the first connecting end 711 of the second wire 72 can be connected to a live wire of the utility power.

Furthermore, the two second rigid electrically-conductive strips 83 pass through the power board 73 and are respectively electrically connected with the second connection end 712 of the first wire 71 and the second connection end 722 of the second wire 72; each junction is provide with a heat shrinkable sleeve 74 to wrap the junction to prevent electrical leakage and enhance waterproof performance.

The connecting component 6 is provided with first through holes 62 for the first wire 71 and the second wire 72 to pass through, and each second connection end 712/722 of each wire passes through the respective first through hole 62 and is connected to the power board 73; second through holes 52 are provided on the lamp holder base 5 for the first wire 71 and the second wire 72 to pass through, and each first connection end 711/721 of the two wires passes through the respective second through hole 52 and is connected to the lamp holder 2. In the embodiment, the connecting component 6, the first wire 71 and the second wire 72 may be integrally formed by injection molding, and each second connection end 712/722 of the two wires is directly connected to the power board 73.

A peripheral surface of the lamp holder base 5 proximal to the lampshade 1 is also provided with a clamping part 53 for clamping by hand or clamping and rotating by a robotic arm.

An accommodating space 122 is provided between the transparent seat 3 and an end of the mounting seat 12 such that the accommodating space 122 is filled with glue 9 to seal the transparent seat 3 and the mounting seat 12 for better waterproof performance.

When using, install the two second rigid electrically-conductive strips 83 and the power board 73 on respective positions on the transparent seat 3; by reflow soldering, weld the two second rigid electrically-conductive strips 83 onto the power board 73; weld the second connection end 712/722 of each wire with a portion of each of the second rigid electrically-conductive strips 83 protruding from the power board 73; place the assembled transparent seat 3 in the mounting seat 12 of the lampshade 1 and press the assembled transparent seat 3 to fit in to the mounting seat 12; add appropriate amount of glue 9 into the accommodating space 122 of the mounting seat 12 for waterproof sealing; connect each second connection end 712/722 with a corresponding second rigid electrically-conductive strip 83 and protect each junction with the heat shrinkable sleeve 74 which is heated and adheres to each junction; pull the first wire 71 and the second wire 72 towards the lamp holder 2 such that the mounting seat 12 of the lampshade 1 is fastened to the first end 41 of the lampshade base 4 and the connecting component 6 is in snap fit with the second end 42 of the lampshade base 4. This invention provides a sealed and waterproof decorative light bulb in a simpler structure with an easier assembling method.

The technical solution aforementioned has the following benefits:

1. The mounting seat 12 is detachably inserted in the first end 41, the third end 43 of the lamp holder base 5 is detachably inserted in the lamp holder 2, the connecting component 6 is detachably inserted in the second end 42, such that the components of the light bulb are fixedly assembled and connected via simple pulling, thereby enhancing the efficiency of producing the light bulb;
2. The mounting seat 12 and the transparent seat 3 are in interference fit and the transparent seat 3 is fitted into the mounting seat of the lampshade 1 by pressing into the mounting seat 12, such that it is well sealed between the transparent seat 3 and the lampshade 1; this also prevents water from entering the light source component in the lampshade 1 and enhances the overall waterproof level of the light bulb;
3. Fill the accommodating space 122 with glue 9, which further enhances the waterproof performance of the light bulb.

Embodiment 2

Figure 10:
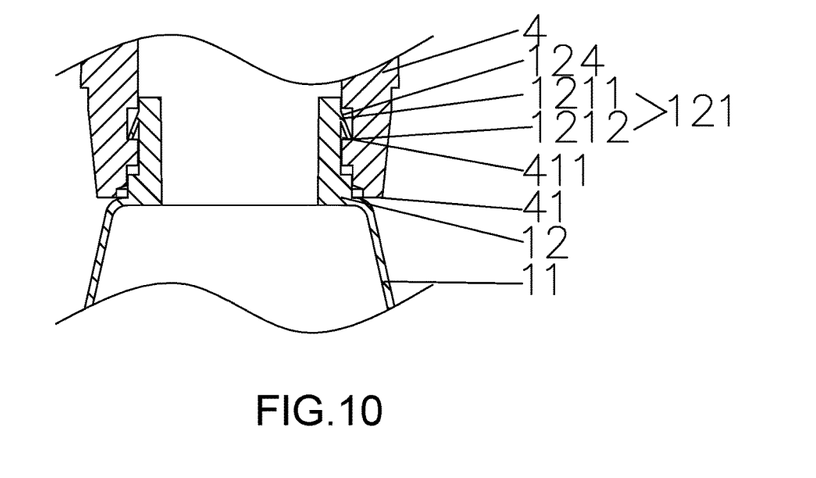
FIG. 10 is a partial sectional view of the lamp showing a sectional area between the lampshade and the lampshade base according to embodiment 2 of this invention.

With reference to FIG. 10, embodiment 2 is only different from embodiment 1 in that, said at least one elastic projection 121 is an elastic plate provided on the outer side wall of the mounting seat 12.

Embodiment 3

Figure 11:
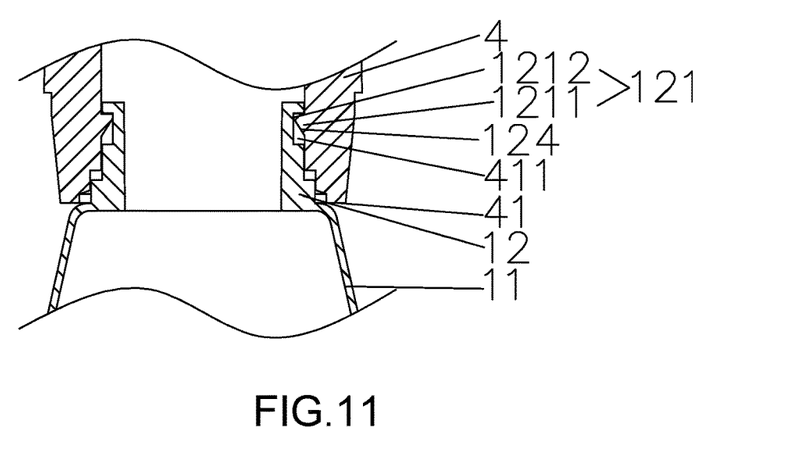
FIG. 11 is a partial sectional view of the lamp showing a sectional area between the lampshade and the lampshade base according to embodiment 3 of this invention.

With reference to FIG. 11, embodiment 3 is different from embodiment 1 in that, the mounting seat 12 is fastened to the first end 41 of the lampshade base 4. Specifically, when the lampshade base 4 is molded by injection, said at least one elastic projection 121 is formed on an inner wall of the first end 41; the outer side wall of the mounting seat 12 is provided with said at least one slot 411 corresponding to said at least one elastic projection 121; the lampshade 1 and the lampshade base 4 are locked by fastening each elastic projection 121 with a corresponding slot 411 to prevent the lampshade 1 and the lampshade base 4 from moving along an axial direction, in other words, to prevent the lampshade base 4 from being pulled away from the lampshade 1 during assembly. Specifically, each elastic projection 121 comprises an inner connecting end 1211 and a free end 1212; an inclined surface 124 which is inclined downwardly from the free end 1212 to the inner connecting end 1211 away from a central axis of the mounting seat 12 is provided between the inner connecting end and the free end; after the corresponding elastic projection 121 is fastened to the corresponding slot 411, the free end of the elastic projection 121 abuts against the corresponding slot 411. As an example, said at least one elastic projection 121 is formed circumferentially and evenly around the inner wall of the first end 41, and when the lampshade 1 is pulled upwardly by an external force during assembly, said at least one elastic projection 121 is elastically deformed in a way that an inner diameter of the first end 41 is increased, and when said at least one elastic projection 121 is deformed to an extent where the inner diameter of the first end 41 of the lampshade base 4 is greater than a diameter of the mounting seat 12, the mounting seat 12 can move upwardly into the first end 41; by continual pulling of the lampshade 1, said at least one elastic projection 121 on the inner wall of the first end 41 resets and enters the corresponding slot 411 formed on the outer side wall of the mounting seat 12; after that, stop pulling the lampshade 1 to complete the assembly of the lampshade 1 and the first end 41 of the lampshade base 4. In this assembled state, the free end of each elastic projection 121 abuts against the corresponding slot 411 so that the lampshade 1 will not be disengaged from the first end 41 because of external forces.

Embodiment 4

Figure 12:
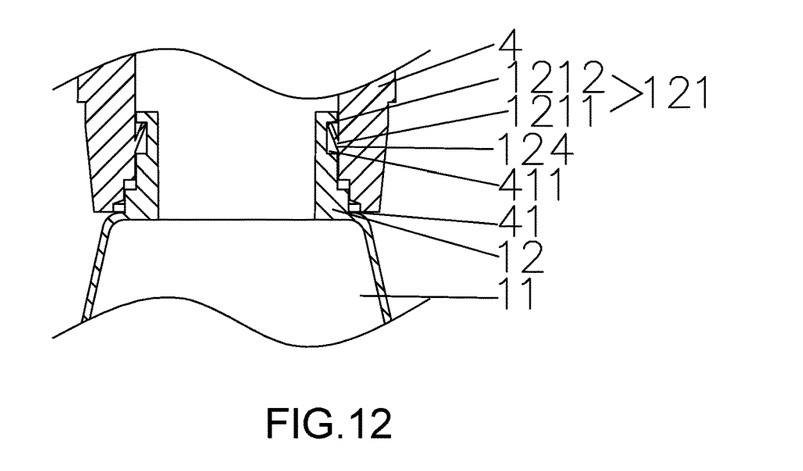
FIG. 12 is a partial sectional view of the lamp showing a sectional area between the lampshade and the lampshade base according to embodiment 4 of this invention.

With reference to FIG. 12, embodiment 4 is different from embodiment 3 in that said at least one elastic projection 121 is an elastic plate provided on the inner wall of the first end 41.

The embodiments of the present invention shown and described herein are illustrative only. Changes, modifications and substitutions can be made to these embodiments by those skilled in the art without departing from the principle and spirit of this invention and shall fall within the scope of this invention as defined by the appended claims.

What is claimed is:

1. A lamp containing a rotation prevention structure, wherein the lamp comprises a lampshade, a lamp holder, and a light source component and a power supply component both provided in the lampshade and electrically connected with each other; the lampshade comprises a cover body and a mounting seat integrated with the cover body; wherein, a connective structure is provided to connect the lampshade and the lamp holder; the connective structure comprises one end connected with the lampshade, and another end connected with the lamp holder; said one end of the connective structure is defined as a first end, and said another end of the connective structure is defined as a third end;

the mounting seat is connected to the first end of the connective structure;
the lamp holder is fitted with the third end of the connective structure; a rotation prevention structure is provided between the mounting seat and the first end of the connective structure to prevent rotation of the lampshade with respect to the connective structure; the rotation prevention structure comprises anti-rotation ribs and anti-rotation grooves corresponding to the anti-rotation ribs; the anti-rotation ribs are fitted in the anti-rotation grooves;
the connective structure comprises a lampshade base, a lamp holder base and a connecting component which fixes the lampshade base with the lamp holder base;
the lampshade base comprises said first end of the connective structure connected with the mounting seat and a second end connected with the connecting component; the connecting component is snap-fitted with the second end of the lampshade base.

2. The lamp of claim 1, wherein the anti-rotation ribs are provided at an outer side wall of the mounting seat along an axial direction of the lampshade; an interior of the first end is provided with the anti-rotation grooves corresponding to the anti-rotation ribs; the anti-rotation ribs are fitted in the anti-rotation grooves.

3. The lamp of claim 1, wherein the anti-rotation ribs are provided on an inner wall of the first end along an axial direction of the lampshade, and the anti-rotation grooves corresponding to the anti-rotation ribs are provided on an outer side wall of the mounting seat; the anti-rotation ribs are fitted in the anti-rotation grooves.

4. The lamp of claim 1, wherein the mounting seat is connected to the first end of the connective structure by fastening.

5. The lamp of claim 4, wherein at least one elastic projection is formed at an outer side wall of the mounting seat; an interior of the first end is provided with at least one slot corresponding to said at least one elastic projection; the lampshade and the first end of the of the connective structure are locked by fastening each elastic projection with a corresponding slot; each elastic projection comprises an inner connecting end and a free end; an inclined surface which is inclined upwardly from the free end to the inner connecting end towards a central axis of the mounting seat is provided between the inner connecting end and the free end; and after each elastic projection is fastened to the corresponding slot, the free end of the elastic projection abuts against the corresponding slot.

6. The lamp of claim 4, wherein at least one elastic projection is formed on an inner wall of the first end; an outer side wall of the mounting seat is provided with at least one slot corresponding to said at least one elastic projection; the lampshade and the first end of the of the connective structure are locked by fastening each elastic projection with a corresponding slot; each elastic projection comprises an inner connecting end and a free end; an inclined surface which is inclined downwardly from the free end to the inner connecting end away from a central axis of the mounting seat is provided between the inner connecting end and the free end; after each elastic projection is fastened to the corresponding slot, the free end of the elastic projection abuts against the corresponding slot.

7. The lamp of claim 1, wherein the second end is provided with a through hole which allows the connecting component to pass through; an outer wall of the connecting component is provided with a groove; an inner wall of the through hole is provided with a bump corresponding to the groove, and the bump is fitted in the groove.

8. The lamp of claim 7, wherein an inner end surface of the groove proximal to the lampshade, and an outer end surface of the bump proximal to the lampshade tilt downwards towards an axis of the lampshade.

9. The lamp of claim 7, wherein an inner end surface of the groove proximal to the lampshade, or an outer end surface of the bump proximal to the lampshade tilt downwards towards an axis of the lampshade.

10. The lamp of claim 1, wherein the power supply component comprises a first wire and a second wire, the lamp holder base and the connecting component are provided with through holes allowing the first wire and the second wire to pass through; first connection ends of the first wire and the second wire pass through the through holes of the lamp holder base and are connected to the lamp holder, while second connection ends of the first wire and the second wire pass through the through holes of the connecting component and are electrically connected to the light source component.

11. The lamp of claim 1, wherein the connecting component and the first wire and the second wire are integrally formed by injection molding.

12. The lamp of claim 1, wherein a transparent seat is provided in the lampshade; the transparent seat is in interference fit with the mounting seat; the transparent seat is transparent and has a columnar shape; a diameter of the transparent seat gradually decreases along a direction away from the lamp holder; a side of the transparent seat proximal to the lamp holder is provided with hooks, which hook onto an end of the mounting seat.

13. The lamp of claim 1, wherein the light source component comprises a transparent stem, a power board fixedly installed on the transparent seat, first rigid electrically-conductive strips inserted to the transparent stem, second rigid electrically-conductive strips inserted to the transparent stem and connected with the power board, and LED filaments fixedly connected between the first rigid electrically-conductive strips and the second rigid electrically-conductive strips; wherein, there are two said second rigid electrically-conductive strips; there are two or more said LED filaments, and the LED filaments are distributed evenly around the transparent stem; each of the second rigid electrically-conductive strips is connected with at least one of said LED filaments.

14. The lamp of claim 13, wherein the two second rigid electrically-conductive strips pass through the power board and are connected with the first wire and the second wire respectively; a junction between each of the second rigid electrically-conductive strips and a corresponding wire is provided with a heat shrinkable sleeve.

15. The lamp of claim 12, wherein an accommodating space in which glue is filled is provided between the transparent seat and the end of the mounting seat.

* * * * *